(No Model.)

C. W. BEESLY.
COMPOSITION FOR PRESERVING.

No. 388,810. Patented Sept. 4, 1888.

WITNESSES.
J. M. Hartnett,
H. H. Easterbrook.

INVENTOR
Charles William Beesly,
By his Atty.
Henry W. Williams

UNITED STATES PATENT OFFICE.

CHARLES WILLIAM BEESLY, OF BOSTON, MASSACHUSETTS, ASSIGNOR TO SILVANUS F. VAN CHOATE, OF SAME PLACE.

COMPOSITION FOR PRESERVING.

SPECIFICATION forming part of Letters Patent No. 388,810, dated September 4, 1888.

Application filed March 8, 1888. Serial No. 266,600. (No specimens.)

*To all whom it may concern:*

Be it known that I, CHARLES WILLIAM BEESLY, a subject of the Queen of Great Britain, residing in Boston, in the county of Suffolk and State of Massachusetts, have invented a new and useful Composition of Matter to be Used for the Preservation of Animal and Vegetable Substances, of which the following is a specification.

This composition has for its object the prevention from putrefaction and decay and the general preservation of any animal or vegetable matter, such as meats, poultry, fish, farm produce, preserves, milk, butter, eggs, beer, ale, fermented liquors, &c.

It consists of the following ingredients, in substantially equal parts, viz: hydrate of potash, chlorate of potash, oxide of manganese, and chloride of potash, as a base. These ingredients having been thoroughly mixed, by agitation or otherwise, the resulting compound is formed into a cone or other desirable shape, the said compound or base being provided with sufficient cohesiveness by the addition of a mucilage consisting of gum-tragacanth and peroxide of hydrogen in substantially the proportions of one part in weight of the former to about twenty parts of the latter. The mucilage thus formed is added to the base in the proportions of about one part in weight of mucilage to ten parts of the base, the composition thus produced consisting of the base, which has the preservative qualities, and the mucilaginous substance is compressed into a mold in the form of a cone or of other desirable shape, said mold being of any suitable material—say of tin or zinc. The bottom of this mold and a portion of the base—say for one-fourth to one-third its height—are perforated in the proportion, say, of twenty-four perforations to the square inch. The mold is placed (with the compound inside) in a pan or dish containing sufficient water or other suitable liquid to cover the perforations.

Figure 1:
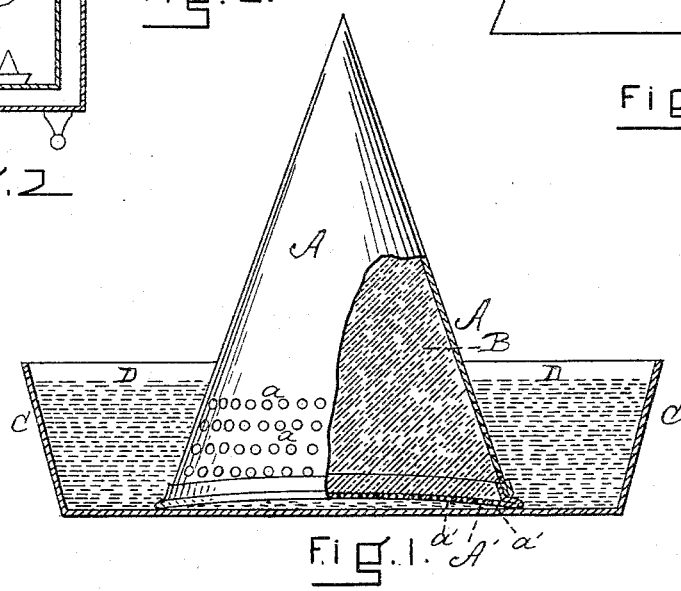

In the accompanying drawings, Figure 1 is an elevation of a mold containing my compound set in a pan (shown in vertical section) and containing liquid, a portion of said mold being represented as broken out. Figs. 2 to 7, inclusive, are views representing the compound placed in different localities, as fully described below.

In Fig. 1, A represents a conical mold perforated at $a$, said mold being provided with the cover or removable bottom A', whereby the compound B is placed in the mold. The bottom, which is also provided with perforations $a'$, is preferably made concave or otherwise raised, so as to allow the liquid in the pan free access to the perforations $a'$ in said bottom. The mold after being filled is placed in the pan C, which is provided with the water or other liquid, D, as above mentioned.

Figure 2:
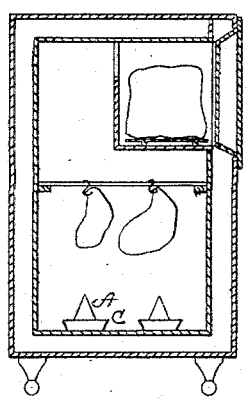

In Fig. 2 the cones containing my compound are shown placed on the bottom of an ice-chest. (Shown in vertical section.) The ice, however, is not essential except for cooling purposes, as the preservative compound is sufficient to prevent decay.

Figure 6:
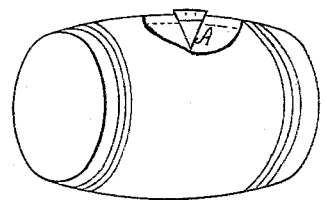
Figure 5:
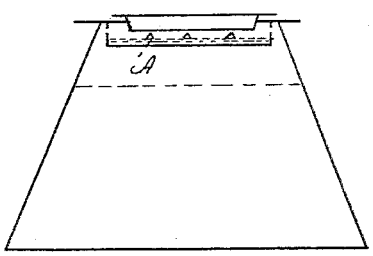
Figure 3:
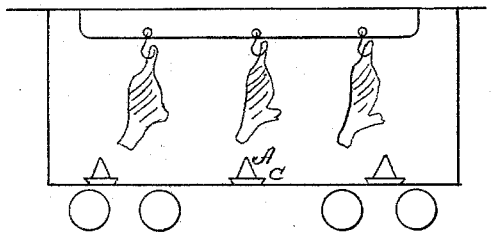
Figure 4:
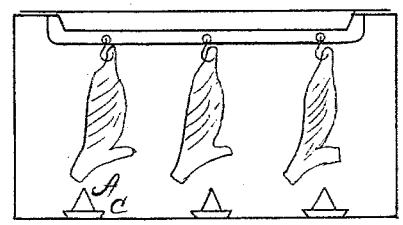
Figure 7:
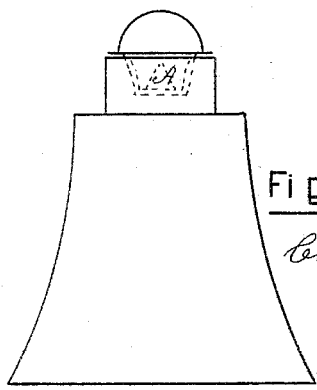

In the remaining figures, which are diagrammatic in character, Fig. 3 shows the cones containing my compound placed on the floor of a railroad-car used in transporting meat. Fig. 4 shows the cones containing the compound in a steamship-chamber for the same purpose. Fig. 5 shows the cones containing the compound placed three in one water-pan, said pan being formed in the cover of a chest or receptacle for butter or other greasy substance. In this case the water-pan is perforated to allow access of the vapor of the compound to the butter. Fig. 6 shows a cone containing the compound reversed and suspended from a bung of a beer-barrel, no water-pan being necessary, as the vapor from the compound absorbs into the beer direct. If desired, instead of a bung, the plan indicated in Fig. 7 can be used. Fig. 7 shows (in broken lines) a cone containing the compound arranged in the cap or stopper of a milk-can, an inner perforated receptacle being provided, whereby access of the vapor of the compound is had to the milk.

There are many other places where the preservative is of great value, such as sick-rooms, hospitals, and for other sanitary purposes.

In all the situations shown in the figures, except Fig. 6, the water or liquid in the pan enters the perforations and causes the composition to gradually dissolve and settle down, and the compound impregnates the liquid, which, evaporating, impregnates the air and the food confined therein with the preserving vapor by which the food is kept from putrefaction. In Fig. 6 the preservative acts directly on the beer in the barrel. In practice I find that a cone-shaped cake of the weight of one pound is sufficient to freshen and preserve about two cubic yards of space with its contents for from three to six months.

For restoring partially-decayed matter to a condition of absolute freshness, the base compound may be dissolved in water or other liquid in about the proportion of one grain, in weight, of the compound to one fluid ounce of water, and the resultant solution is then applied to the matter by dipping the same into the said solution. The result is an almost instantaneous restoration of the decayed matter to a state of absolute freshness.

Having thus fully described my invention, what I claim, and desire to secure by Letters Patent, is—

1. The herein-described composition of matter to be used for preserving animal or vegetable substances, consisting of hydrate of potash, chlorate of potash, oxide of manganese, and chloride of potash, in substantially equal parts.

2. The herein-described composition of matter to be used for preserving animal or vegetable substances, consisting of hydrate of potash, chlorate of potash, oxide of manganese, and chloride of potash, in substantially equal parts, and a mucilaginous substance or compound.

CHARLES WILLIAM BEESLY.

Witnesses:
HENRY W. WILLIAMS,
J. M. HARTNETT.